(12) United States Patent
Liu et al.

(10) Patent No.: US 10,873,529 B2
(45) Date of Patent: Dec. 22, 2020

(54) METHOD AND APPARATUS FOR LOW LATENCY DATA CENTER NETWORK

(71) Applicant: Futurewei Technologies, Inc., Plano, TX (US)

(72) Inventors: Fangping Liu, San Jose, CA (US); Zhenjiang Li, San Jose, CA (US); Serhat Nazim Avci, Milpitas, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/829,319

(22) Filed: Dec. 1, 2017

(65) Prior Publication Data

US 2019/0173793 A1 Jun. 6, 2019

(51) Int. Cl.
*H04L 12/801* (2013.01)
*H04L 12/751* (2013.01)
*H04L 12/825* (2013.01)

(52) U.S. Cl.
CPC .............. *H04L 47/12* (2013.01); *H04L 45/02* (2013.01); *H04L 47/25* (2013.01)

(58) Field of Classification Search
CPC .......... H04L 47/12; H04L 47/25; H04L 45/02
USPC ......................................................... 370/235
See application file for complete search history.

(56) References Cited

U.S. PATENT DOCUMENTS

| | | | |
|---|---|---|---|
| 2011/0235518 A1* | 9/2011 | Halabi | H04L 47/30 370/237 |
| 2013/0297788 A1* | 11/2013 | Itoh | H04L 43/0876 709/224 |
| 2014/0112128 A1* | 4/2014 | Kwan | H04L 47/12 370/230 |
| 2015/0149611 A1* | 5/2015 | Lissack | H04L 43/0817 709/224 |
| 2016/0314012 A1* | 10/2016 | Rong | H04L 47/12 |
| 2017/0171091 A1* | 6/2017 | Nayak | H04L 47/25 |
| 2017/0208004 A1* | 7/2017 | Tripathi | H04L 49/253 |
| 2018/0077068 A1* | 3/2018 | Dhanabalan | H04L 47/2433 |
| 2018/0232252 A1* | 8/2018 | Rong | G06F 9/45558 |
| 2018/0234343 A1* | 8/2018 | Zdornov | H04L 47/621 |

(Continued)

*Primary Examiner* — Hassan A Phillips
*Assistant Examiner* — Mohammed S Chowdhury
(74) *Attorney, Agent, or Firm* — Vierra Magen Marcus LLP

(57) ABSTRACT

Methods and apparatus for determining and adjusting traffic rate limits to reduce queuing delays and latency in a data center network. In various embodiments, a network controller receives network topology information and traffic data relating to flows of the network. The traffic data includes traffic matrix information, flow path information, and pause frame distribution information. Based on this information, the network controller identifies server network node interfaces that are the source of a pause frame. Flows associated with such network node interfaces are also identified and ranked based on traffic volume. For ranked flows meeting predetermined criteria, reduced traffic rate limits are calculated and sent to associated server network node interfaces. In some embodiments, the reduced traffic rate limits are incrementally recovered when normal traffic resumes on a paused link. In further embodiments, traffic rate limits are also adjusted for flows of highly utilized and underutilized network node interfaces.

18 Claims, 9 Drawing Sheets

(56) References Cited

U.S. PATENT DOCUMENTS

2018/0248809 A1* 8/2018 Kurosawa ............... H04L 47/22
2019/0104057 A1* 4/2019 Goel .................... H04L 47/122

* cited by examiner

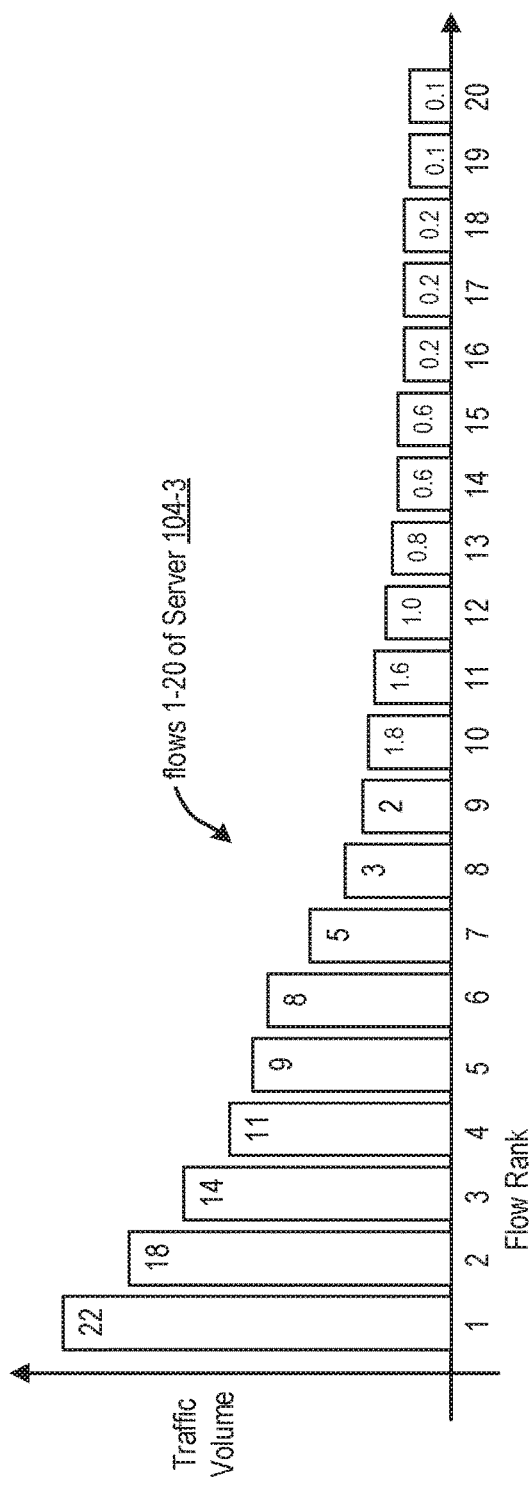
FIG. 4
FIG. 5
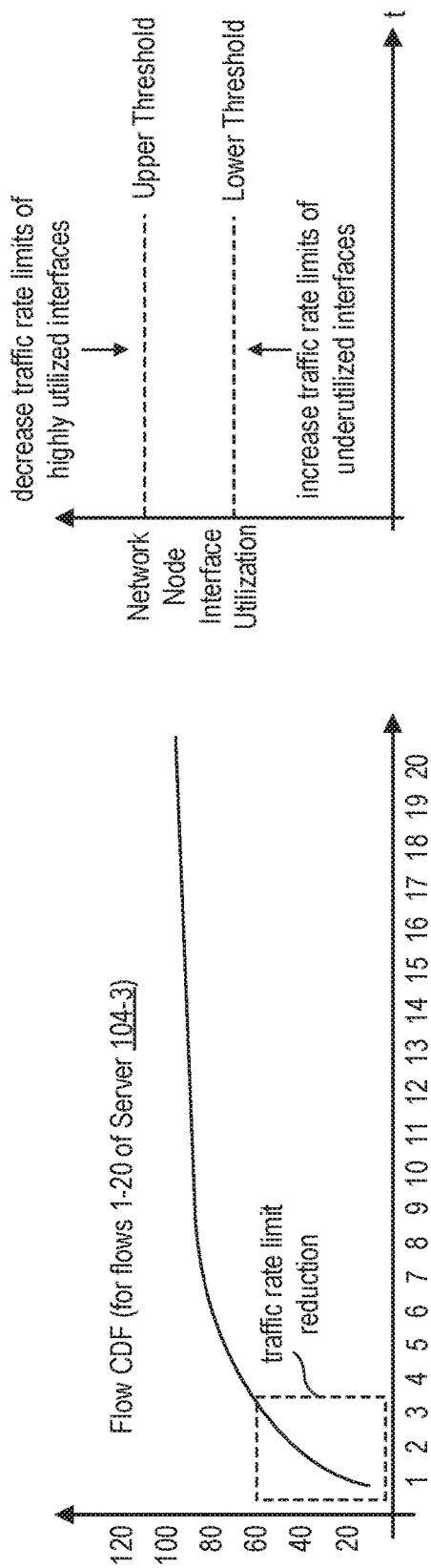
FIG. 6

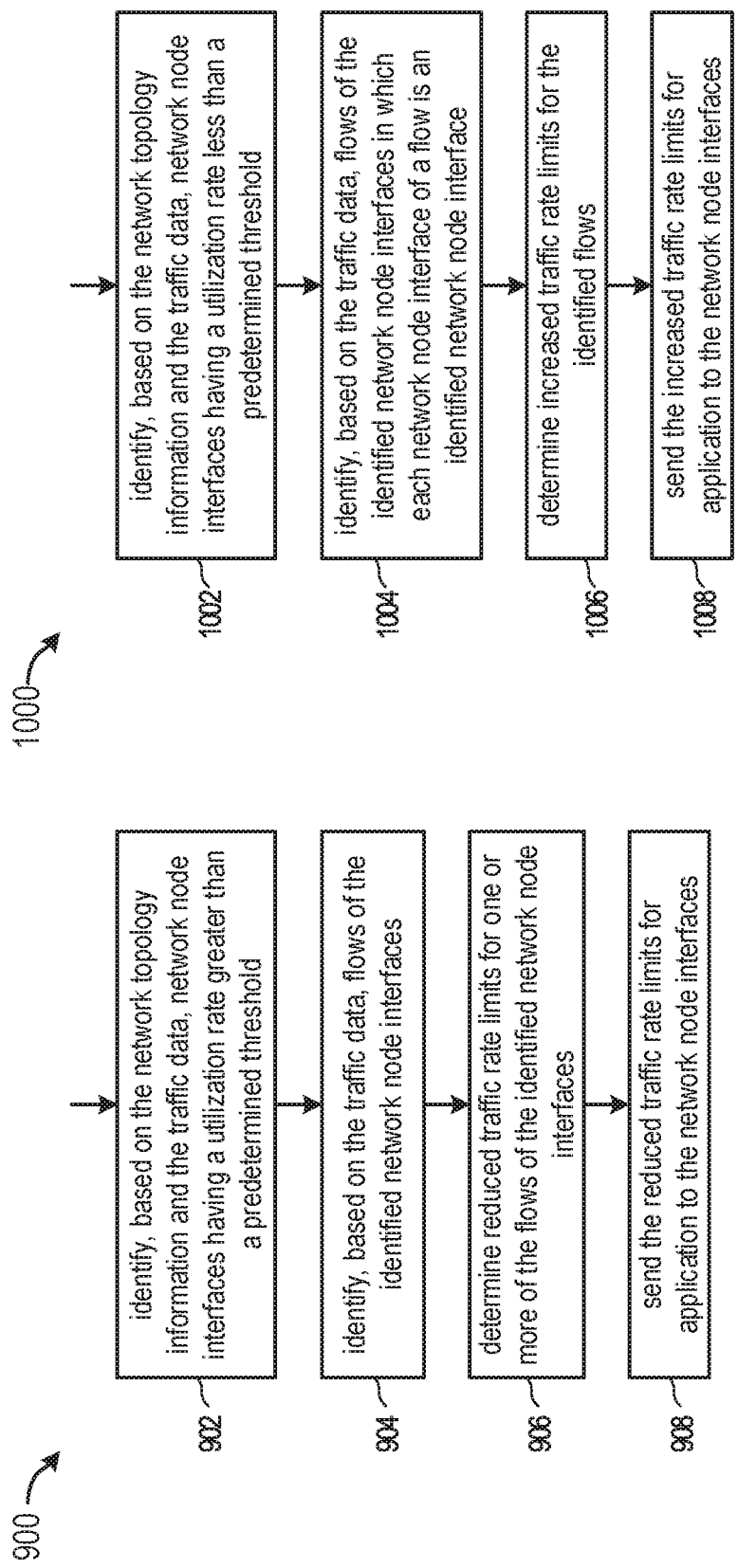

METHOD AND APPARATUS FOR LOW LATENCY DATA CENTER NETWORK

BACKGROUND OF THE INVENTION

The progressive growth of cloud computing has been accompanied by an increasing number of applications which require guaranteed low latency in data center networks. Such applications include, for example, distributed memory cache applications, storage applications, and deep learning applications. In general, network latency consists of software stack latency, transmission latency, propagation latency, queuing latency, retransmission latency, etc. Various approaches have been employed in efforts to reduce such network latency, including software stack bypass, kernel bypass, and retransmission mitigation techniques.

SUMMARY

The present disclosure describes scalable methodologies and apparatus for determining and adjusting traffic rate limits to reduce queuing delays and latency in a network such as a data center network. In various embodiments, a device such as a network controller receives network topology information and traffic data relating to flows of the network. The traffic data includes traffic matrix information, flow path information, and pause frame distribution information. Based on this information, the network controller identifies server network node interfaces that are the source of a pause frame. Flows associated with such network node interfaces are also identified by the network controller and ranked based on respective traffic volume. Reduced traffic rate limits are calculated for ranked flows meeting predetermined criteria, and then sent to associated servers. The predetermined criteria may include, for example, identifying one or more of the ranked flows having a cumulative traffic volume that constitutes a predetermined portion of a total flow traffic volume of the identified network node interface.

In some embodiments, the reduced traffic rate limits are incrementally recovered when normal traffic resumes on a paused link. In further embodiments, traffic rate limits are also adjusted for certain flows of highly utilized and underutilized network node interfaces. Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

FIG. 4 is an example of ranking flows of a server, based on traffic volume, in accordance with an embodiment of the present disclosure.

FIG. 5 is an example of selecting flows of a server for which traffic rate limit reductions are determined in accordance with an embodiment the present disclosure.

FIG. 6 is an example of adjusting traffic rate limits based on network node interface utilization in accordance with an embodiment of the present disclosure.

FIG. 9 is a logic diagram illustrating traffic rate limit reductions, based on network node interface utilization rates, in accordance with embodiments of the present disclosure.

FIG. 10 is a logic diagram illustrating traffic rate limit increases, based on network node interface utilization rates, in accordance with embodiments of the present disclosure.

DETAILED DESCRIPTION

In order to support converged networks, including the lossless or near lossless Ethernet links required by protocols such as Fibre Channel over Ethernet (FCoE) and remote direct memory access (RDMA) over Converged Ethernet (RoCE or RoCEv2), priority flow control (PFC) and similar technologies have been developed. Priority flow control, as defined in the IEEE 802.1Qbb standard, enables lossless transmission of Layer 2 flows carried on an Ethernet link by providing a link-level flow control mechanism (PFC pause frames) that can be controlled independently for flows having differing classes of service. In contrast, the IEEE 802.3X pause frame, developed prior to the PCF pause frame, operates to pause all flows on a recipient network interface, which might include control plane and other relatively high priority traffic.

The need for PFC pause frames typically arises when a network interface controller (NIC) input buffer is congested, and a data flow needs to be paused to prevent buffer overflow conditions and dropped packets. Queuing delays associated with a paused flow, however, negatively impact the queuing latency component of overall network latency. Pause frames and the resulting queuing delays can be triggered by excessive traffic in a network, including traffic of relatively low priority.

To address such issues, novel system architectures and methodologies are introduced below for utilizing traffic matrix information, network traffic load information, network congestion information (such as pause frame distribution information) to proactively improve congestion conditions in a network. This is accomplished, in part, by determining and adjusting end-to-end traffic rate limits in a manner that reduces network queuing delays while also maintaining a reasonable level of network utilization. Such architectures and methodologies are adaptable and scalable to support a large number of servers and deployment scenarios.

Figure 1:
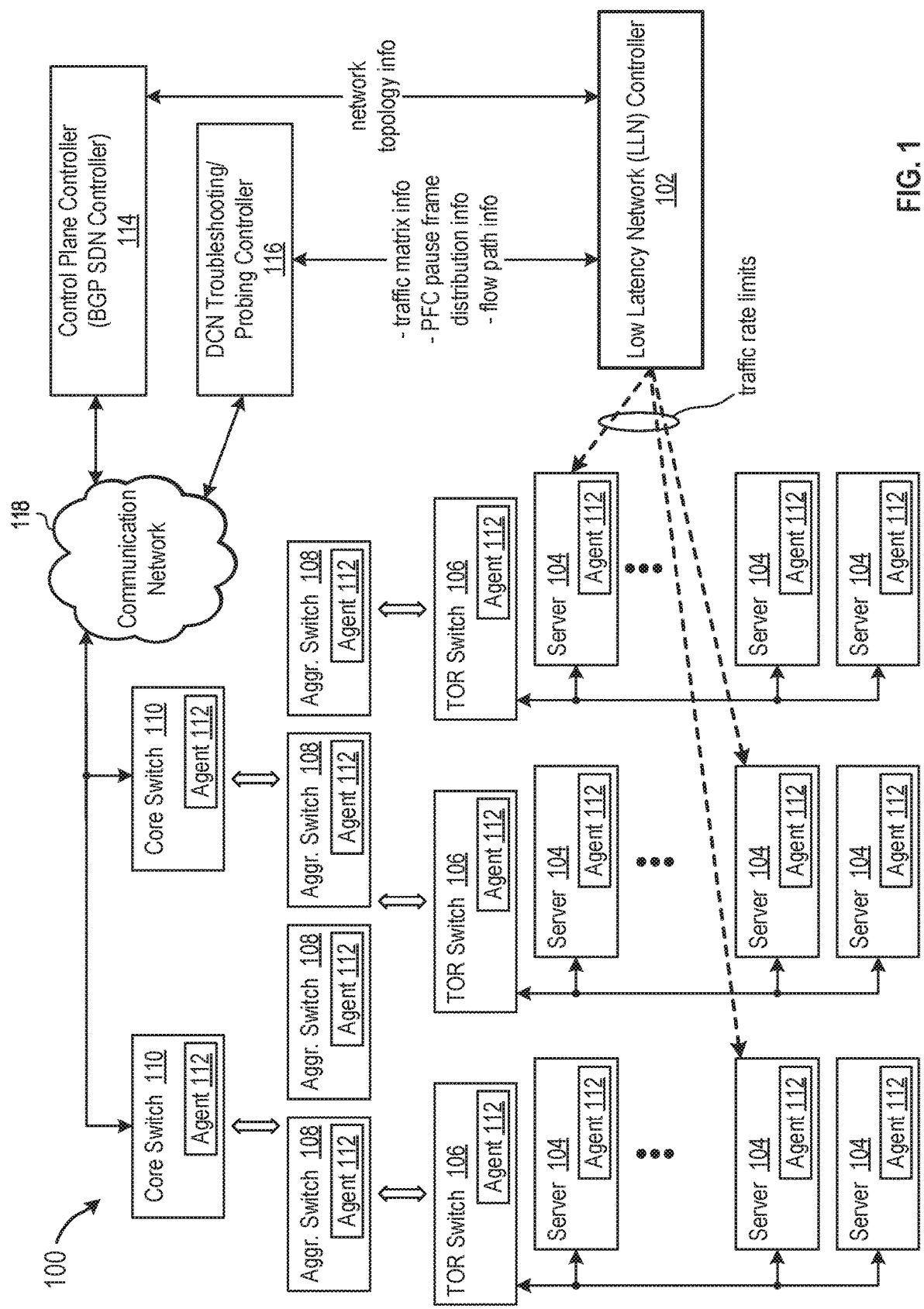
FIG. 1 illustrates a data center network and low latency network controller in accordance with an embodiment of the present disclosure.

FIG. 1 illustrates a data center network (DCN) 100 and low latency network (LLN) controller 102 in accordance with an embodiment of the present disclosure. The DCN 100 includes servers 104, organized into racks using top-of-rack (TOR) switches 106, aggregator switches and core switches 110. A rack is a collection of servers that are typically connected to a single hardware frame. A data center is a collection of racks that are located (though not necessarily) at a physical location. The components of the DCN 100 need not necessarily be located at a common location, and the infrastructure of a DCN 100 may be distributed across one or more geographic regions. Any number of servers 104 may be organized into each rack, subject to the physical constraints of the rack, and any number of racks may be organized into a data center. The core switches 110 are high capacity switches that connect the backbone of the DCN 100 to one or more communication network 118.

The control plane controller 114 functions, in part, to manage flow control of the devices of the DCN 100 (or "data plane") and establish network topology. In one example, the control plane controller 114 is a border gateway protocol (BGP) software-defined-network (SDN) controller that communicates with the DCN 100 via the communication network 118. In another example, the control plane controller 114 is implemented in firmware of routers and switches.

Each of the servers 104, aggregator switches 106, TOR switches 108, and core switches 110 of the illustrated embodiment includes an agent 112. Briefly, an agent 112 operates in conjunction with a DCN troubleshooting/probing controller 116 (referred to below as "probing controller 116") to perform network wide end-to-end communication monitoring (in near real time) of the DCN 100 utilizing server probing. In operation, the probing controller 116 generates probes to test the connection between nodes of the DCN 100. For example, if each node of a pair of nodes corresponds to a server 104, the probe tests the connection between the agents 112 of the two servers 104. As another example, if each of the pair of nodes corresponds to a DCN 100, the probe tests the connection between the two DCNs 100 by testing the connection between a server agent 112 in a core switch 110 of the first DCN 100 and a server agent 112 in a core switch 110 of the second DCN 100.

In some example embodiments, the probing controller 116 sends probe lists, used to collect network/trace data, to individual agents 112 using a representational state transfer (REST) application programming interface (API) or similar predefined set of stateless operations. As described more fully below in conjunction with FIG. 2, such messaging can also be used for communications between the LLN controller 102, probing controller 116 and control plane controller 114.

Data traffic in networks such DCN 100 is typically deconstructed into flows. As used below, a "flow" refers to a sequence of packets that are generated by an application and sent from a source node to a destination node of a network (e.g., network node interfaces of servers of a DCN 100). A flow may be, for example, a short flow having stringent latency requirements or a longer, multi-hop flow with relatively relaxed latency requirements.

In the illustrated example, LLN controller 102 interacts with the control plane controller 114 to obtain network topology information relating to the DCN 100. The LLN controller 102 further interacts with probing controller 116 to obtain traffic data relating to flows of the DCN 100 for use in managing network latency and congestion via traffic rate limits. Such traffic data includes, for example, traffic matrix information, flow path information, pause frame distribution information, network congestion status information (e.g., PFC pause frame distribution information), etc.

In general, a traffic matrix of a network provides a description, measure, or estimation of aggregated traffic flows that enter, traverse, and leave a network. For example, the traffic matrix may include an entry for the amount of traffic that traverses the network between a first node and a second node, and further entries relating to the flow traffic volume of individual flows between the first node and second node (including intermediary nodes). Each traffic matrix has a scope that defines its network edge, which may be relatively limited and/or confined to a specific network such as a data center network, or may include external elements such as border routers. In addition, traffic matrix information can be generated at a server and/or virtual machine level.

In an example of operation, the LLN controller 102 identifies, based on a network topology information and the pause frame distribution information, one or more network node interfaces (e.g., of a server 104) that are a source of a pause frame. The LLN controller 102 further identifies, based on the traffic data, one or more flows supported by the identified network node.

The LLN controller 102 utilizes the traffic data and predetermined criteria to determine a reduced traffic rate limit for each of a plurality of the identified flows (or class of identified flows). The traffic data can be utilized to rank flows based on traffic volume, and a plurality of flows can be identified based on predetermined criteria such as top flows that comprise a cumulative traffic volume that constitutes a specified portion of the total flow traffic volume of an identified network node interface. Other such predetermined criteria may be utilized. Determining a reduced traffic rate limit can include, for example, reducing a current traffic rate limit by a percentage basis. Traffic rate limits calculated by the LLN controller 102 are sent to the DCN 100 (e.g., via the communication network 118) to be applied to network node interfaces of targeted servers. Further examples of a LLN controller 102 and operations thereof to determine traffic rate limits are described more fully below in conjunction with FIGS. 2 and 7-11.

Any of the machines, databases, or devices shown in FIG. 1 may be implemented in a general-purpose computer specifically modified (e.g., configured or programmed) by software and/or specialized hardware to be a special-purpose computer or server to perform the functions described herein for that machine, database, or device. For example, a computer system able to implement any one or more of the methodologies described herein is discussed below with respect to FIG. 11.

Figure 2:
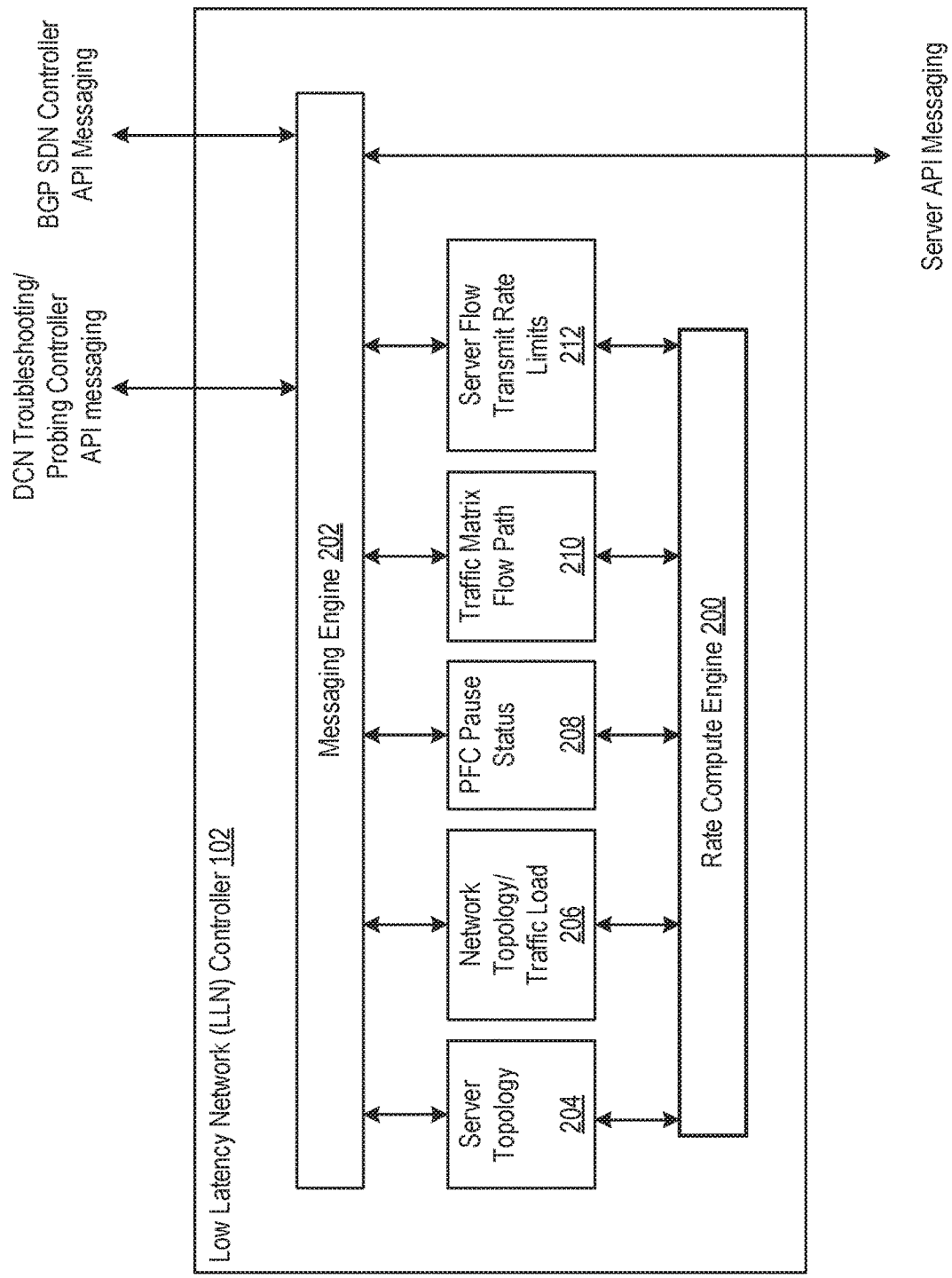
FIG. 2 is a functional block diagram of a low latency network controller in accordance with an embodiment of the present disclosure.

FIG. 2 is a block diagram of a low latency network controller 102 ("LLN controller 102") in accordance with an embodiment of the present disclosure. The illustrated LLN controller 102 includes a rate compute engine 200, a messaging engine 202, server topology module 204, network topology/traffic load module 206, PFC pause status module 208, traffic matrix flow path module 210, and server flow transmit rate limits module 212. Briefly, the rate compute engine 200, in conjunction with modules 204-212, utilizes traffic data and network topology information received via the messaging engine 202 to determine traffic rate limits that are applied to the servers of the DCN 100 in order to reduce latency of flows in the DCN 100.

In some example embodiments, the messaging engine 202 utilizes a standardized (or proprietary) application programming interface for messaging with the control plane controller 114, probing controller 116, and/or DCN 100. For example, messages may be sent and received using the representational state transfer (REST) application programming interface (API). The pseudo-code below provides examples of such messaging, including messages sent or received by the messaging engine 202 to request flow information and pause frame distribution information, receive network topology information, and send initial/ adjusted traffic rate limits. In this messaging, "sip"/"dip" represent source/destination ip addresses, "sport"/"dport" represent source/destination port numbers, "dscp" represents a differentiated services code point, "traffic-rate" represents a traffic rate limit value, etc.

Traffic Demand Matrix REST API Message:

```
{
   "Message-signature": "Traffic-Demand-Message",
   "nmb-of-flows":n,
   "flows":[{"sip": "", "dip": "", "traffic-rate":xxx},]
}
```

Flow Path Report REST API Message:

```
{
   "Message-signature": "FlowPathMessage",
   "nmb-of-flows":n,
   "flows":[{
        "sip":"",
        "dip":"",
        "sport":"",
        "dport":"",
        "ip-protocol":icmp:udp:tcp",
        "dscp":"",
        "topology-tag":{
                "level":"",
                "svid":"",
                "dvid":"",
        },
        "nmb-of-paths":n
        "paths":[{
                "destination-reached":0:1,
                "hops-count":n,
                "hops":[{"hop-index:0, 'ip':x.x.x.x",
                "latency":xxx, },]
        },]
   },]
}
```

PFC Paused Links REST API Message:

```
{
   "Message-signature": "PFC-pause-distribution-Message",
   "nmb-of-links":n,
   "pfc-pause-links":[{"sip": "", "dip": "", "traffic-rate":xxx},]
}
```

Flow Rate Limit REST API Message:

```
{
   "Message-signature": "Flow-rate-limit-Message",
   "nmb-of-flows":n,
   "flows":[{"sip": "", "dip": "", "traffic-rate":xxx},]
}
```

Other messaging formats may be utilized depending on the specific implementations of the LLN controller 102 and other controllers. When a plurality of network interfaces are utilized by the LLN controller 102 for sending and receiving data and messages (e.g., when separate network interfaces are used to receive traffic data/network topology information and to send traffic rate limits the servers of the DCN 100), such network interfaces may be referred to herein as a singular network interface. It is further noted that in certain embodiments, the functionality of the probing controller 116 may be included within the LLN controller 102.

Figure 3A:
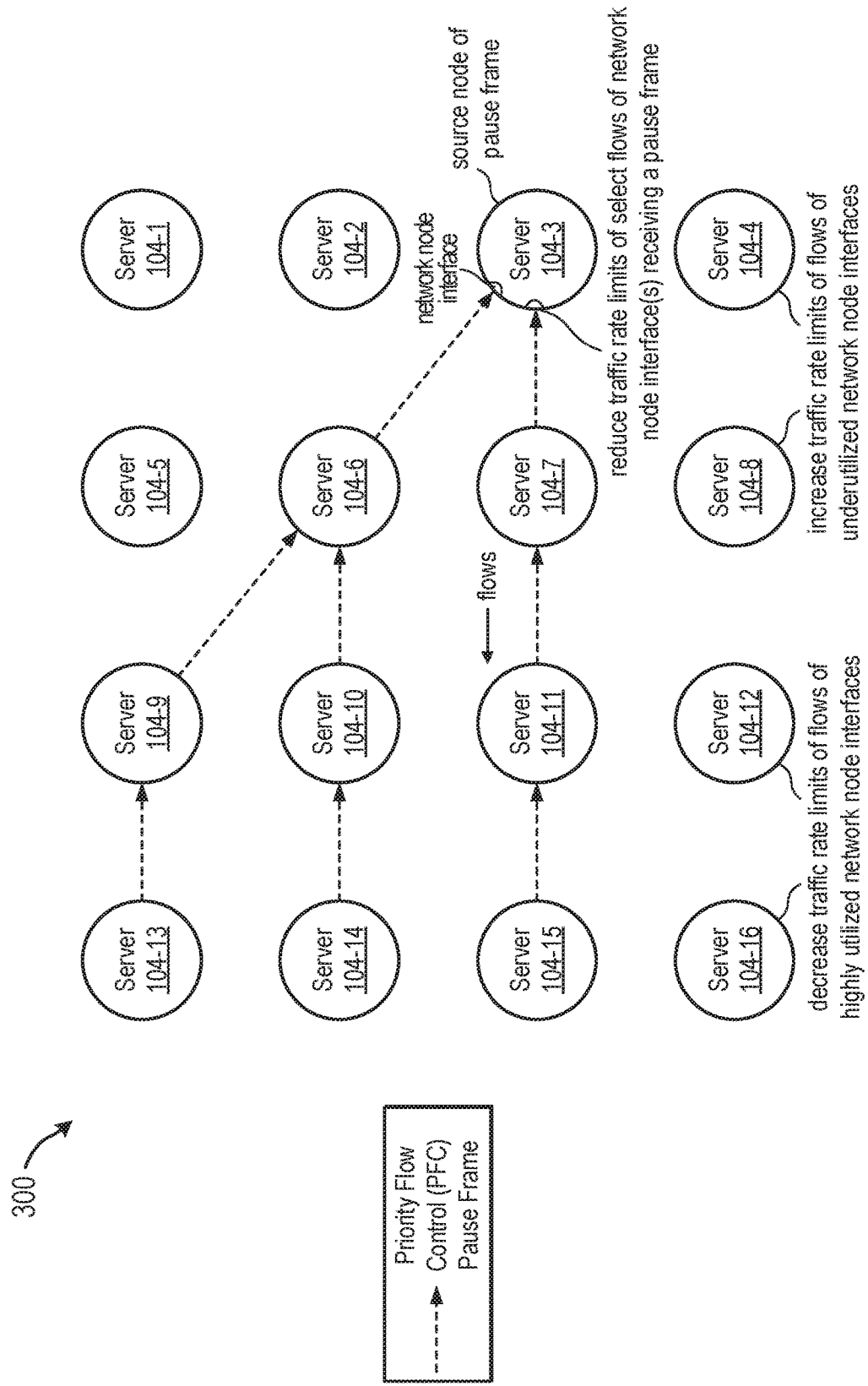
FIG. 3A is a block diagram illustrating an example of a pause frame distribution between servers of a data center in accordance with an embodiment of the present disclosure.

FIG. 3A is a block diagram illustrating an example of a pause frame distribution 300 between servers 104-1-104-16 of a data center in accordance with an embodiment of the present disclosure. In the illustrated example, various communication links between the servers 104-1-104-16 are paused by pause frames (e.g., pause frames including PFC data) sent on a hop-by-hop basis. The pause frames operate to effectively pause one or more flows between the servers by blocking the downstream transmission of frames (e.g., frames having a specified priority level) to a port on which a receiver is connected. For example, pause frames may be communicated to pause a first flow between from servers 104-3, 104-7, 104-11 and 104-15. In other examples, pause frames are communicated are communicated to pause a second flow between servers 104-3, 104-6, 104-9, and 104-13, and a third flow between servers 104-6, 104-10, and 104-14.

An upstream server or a network node interface of an upstream server receiving one or more pause frames—such as server 104-3—may be referred to herein as the source of a pause frame. More particularly, the source of a pause frame is a network node or network node interface that receives a pause frame, but does not transmit a related downstream pause frame. Such sources of pause frames are targeted for reduced traffic rate limits as detailed herein. In additional examples, such as described in conjunction with FIG. 9 and FIG. 10, traffic rate limits of flows of highly utilized network node interfaces are decreased (e.g., in an incremental manner) to reduce predicted congestion conditions. Likewise, traffic rate limits of flows through underutilized network node interfaces can be increased to improve network bandwidth.

By way of example and not limitation, a network node interface of a server 104 can be a network interface controller (also known as a "NIC", network adapter, LAN adapter, or similar terms) that implements the electronic circuitry required to communicate using a physical layer and data link layer standard such as Ethernet. In addition, a network node interface may be a single port network interface or a multiport network interface, and incorporate one or more receive queues and one or more transmit queues. A server 104-1-104-16 can incorporate more than one network node interface, each of which may support a plurality of separate flows. It also is noted that servers 104-1-104-16 need not be housed in a shared rack, and any combination of the servers 104-1-104-16 may be included in one or more racks. Further, the servers 104-1-104-16 may be part of a network other than a data center network.

Figure 3B:
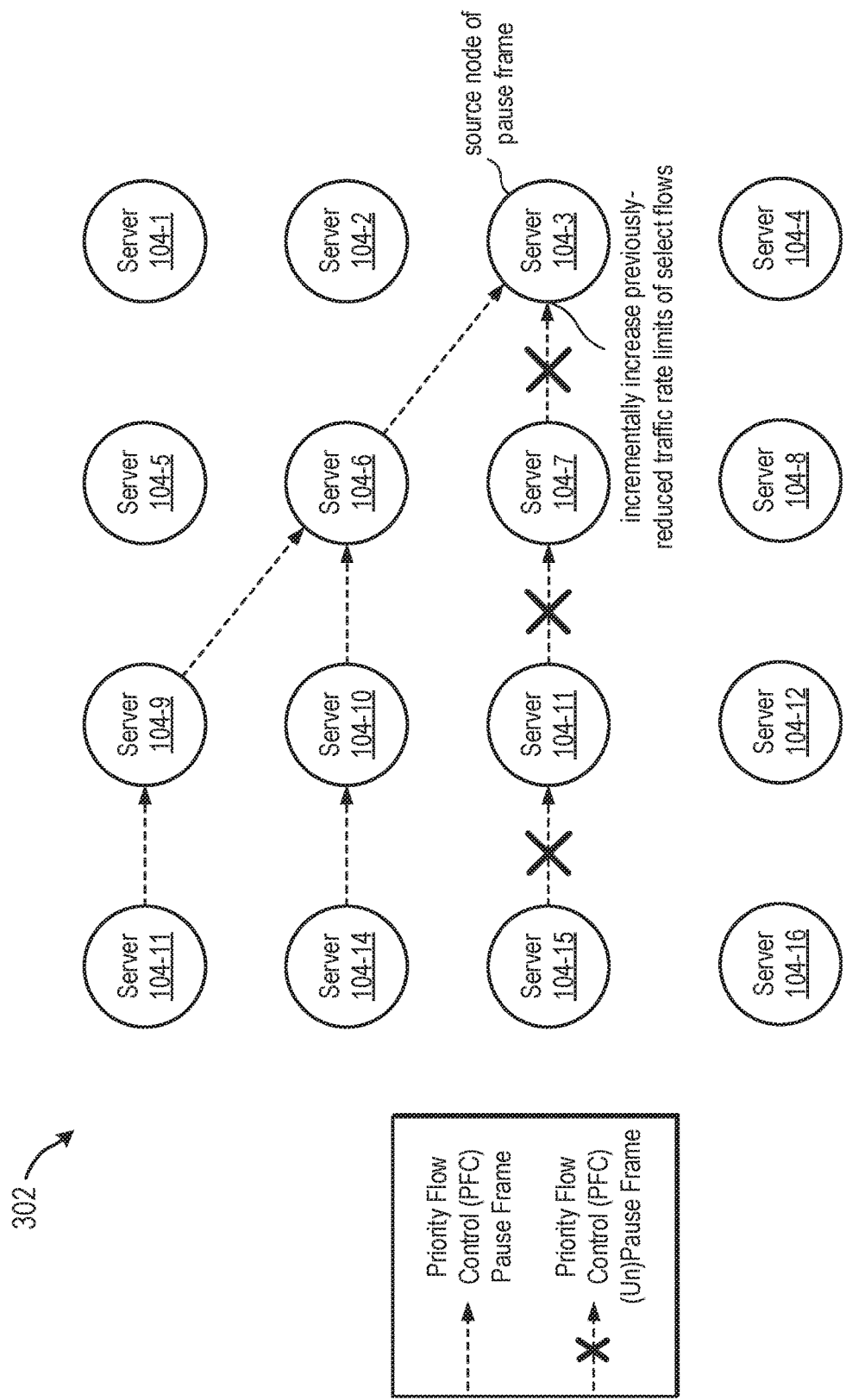
FIG. 3B is a block diagram illustrating another example of a pause frame distribution between servers of a data center in accordance with an embodiment of the present disclosure.

FIG. 3B is a block diagram illustrating another example of a pause frame distribution 302 between servers of a data center in accordance with an embodiment of the present disclosure. In this example, the pause frames between servers 104-15 and 104-11, servers 104-11 and 104-7, and servers 104-7 and 104-3 have expired or been cancelled by a further (un)pause frame (e.g., a pause frame having a timer value of zero duration may be used to cancel a prior, unexpired pause frame). Accordingly, the network node interface of server 104-3 that is servicing server 104-7 is no longer considered a source of a pause frame with respect to the relevant flows. To improve network throughput, traffic rate limit recovery procedures (such as described in conjunction with FIG. 8) may be performed on the network node interface of server 104-3. Such procedures can be based, at least in part, on historical traffic rate limit data stored in conjunction with previous traffic rate limit reduction operations.

FIG. 4 is an example of ranking flows of a server, based on traffic volume, in accordance with an embodiment of the present disclosure. In this example, flows 1-20 of a network node interface of server 104-3 of FIG. 3A (e.g., a network node interface that is the source of a pause frame) are ranked, based on respective flow traffic volume values. The ranking may be performed, for example, by the LLN controller 102 using traffic data from probing controller 116. In the illustrated example, flows 1 and 20 have a relative flow traffic volume of 22:0.1. As described below, ranking of flows can be utilized to identify flows meeting predetermined criteria for reductions in traffic rate limits, such as high traffic volume flows that contribute to network congestion or potential network congestion. In alternative examples, flows or groupings of flows may be separately ranked based on a class of service value associated with each of the flows.

FIG. 5 is an example of selecting flows of a server for which traffic rate limit reductions are determined in accordance with an embodiment the present disclosure. In the illustrated example, predetermined criteria is applied to the flows 1-20 of FIG. 4. The predetermined criteria includes ranking the flows based on respective traffic volume and identifying one or more of the ranked flows as having a cumulative traffic volume that constitutes a predetermined portion of a total traffic volume of an identified network node interface. In the illustrated flow cumulative distribution function, flows 1-3 are identified as comprising 60% of the total traffic volume of flows 1-20, and a traffic rate limit reduction is therefore calculated for each of these flows. In one example, the LLN controller 102 determines a current traffic rate limit for each of flows 1-3, and calculates reduced traffic rate limits by decreasing the current traffic rate limits by a percentage basis. The percentage basis need not be the same for each flow, and may vary over time depending on network congestion levels, priority of traffic considerations, etc. Further, other predetermined criteria can be utilized for identifying flows subject to traffic rate reduction (e.g., flows having a specified traffic volume, flows of a certain priority level having a specified traffic volume, etc.).

FIG. 6 is an example of adjusting traffic rate limits based on network node interface utilization in accordance with an embodiment of the present disclosure. In this example, network node interface utilization rates (e.g., as indicated by traffic data) are analyzed by the LLN controller 102 and compared to threshold values to identify interfaces that (1) have the potential of causing undesirable network congestion or (2) may be underutilized. In some examples, such network node interfaces include interfaces that were not subject to traffic rate limit adjustments such as described above in conjunction with FIG. 4 and FIG. 5.

In the illustrated example, network node interfaces having a utilization rate above an (predetermined) upper threshold value are identified by the LLN controller 102. Flows through such interfaces are also identified, and the LLN controller 102 decreases the associated traffic rate limits for some or all of the identified flows in order to reduce the utilization rates of the identified interfaces. Examples of such operations are described below in conjunction with FIG. 9.

The LLN controller 102 further identifies network node interfaces having a utilization rate below a (predetermined) lower threshold value. Flows through such interfaces are also identified. In one embodiment, such as described in conjunction with FIG. 10, traffic rate limits are increased for flows in which each associated network node interface has a utilization rate below the lower threshold value in order to improve network performance. The traffic rate limits adjusted as shown in FIG. 6 may include, for example, initial traffic rate limits established by the LLN controller 102.

Figure 7:
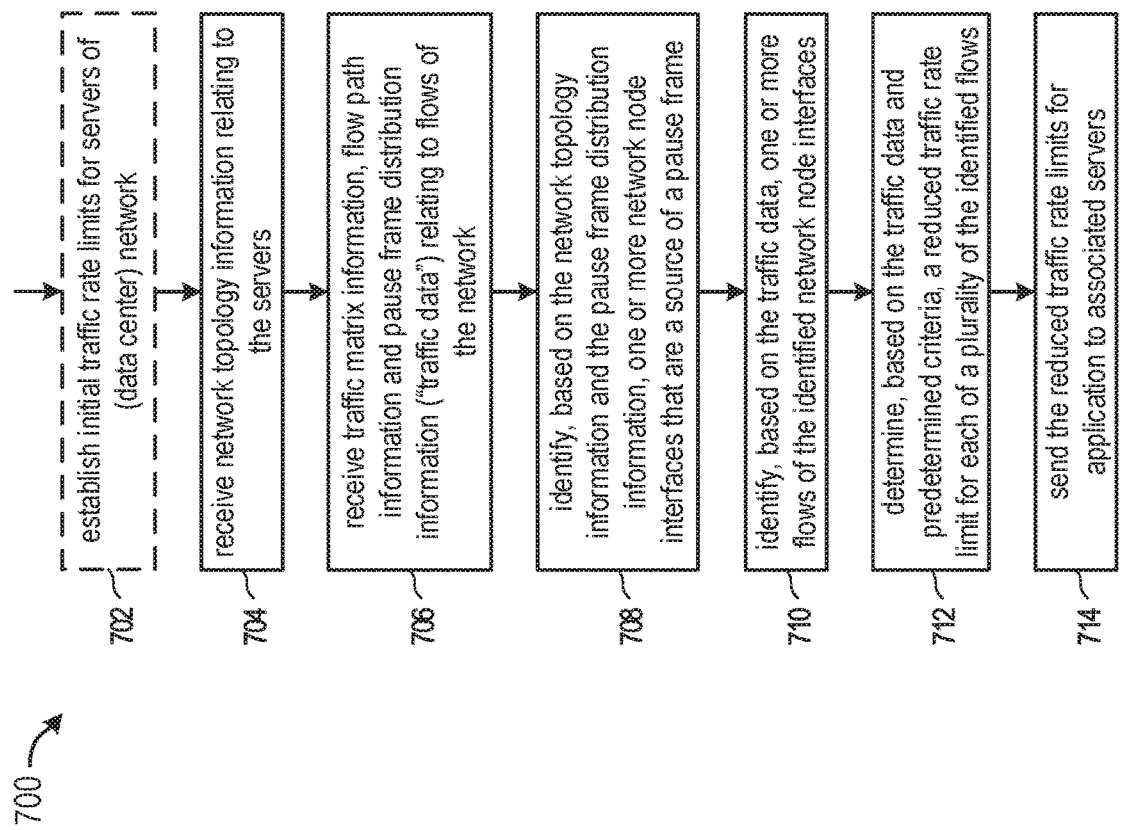
FIG. 7 is a logic diagram illustrating traffic rate limit reductions, based on pause frame distribution information, in accordance with an embodiment of the present disclosure.

FIG. 7 is a logic diagram 700 illustrating traffic rate limit reductions, based on pause frame distribution information, in accordance with an embodiment of the present disclosure. By way of example and not limitation, the logic diagram 700 is described as being performed by the LLN controller 102 of FIGS. 1 and 2.

In operation 702, the LLN controller 102 optionally establishes initial traffic rate limits for servers of a network such as data center network 100. The initial traffic rate limits may be determined, for example, using default rates and/or traffic data, including traffic matrix data. Next (operation 704), the LLN controller 102 receives network topology information relating to the servers and (operation 706) traffic matrix information, flow path information and pause frame distribution information (collectively referred to as "traffic data") relating to flows of the network.

In operation 708, the LLN controller 102 identifies, based on the network topology information and the pause frame distribution information, one or more network node interfaces (e.g., of a server 104) that are a source of a pause frame. The LLN controller 102 further identifies (operation 710), based on the traffic data, one or more flows supported by the network node interfaces identified in operation 708.

In operation 712, the LLN controller 102 utilizes the traffic data and predetermined criteria to determine a reduced traffic rate limit for each of a plurality of the identified flows. As described above in various examples, the traffic data can be utilized to rank flows based on traffic volume, and a plurality of flows can be identified based on predetermined criteria such as top flows that comprise a cumulative traffic volume that constitutes a specified portion of the total flow traffic volume of an identified network node interface. Other such predetermined criteria may be utilized. Determining a reduced traffic rate limit can include, for example, reducing a current traffic rate limit by a percentage basis.

The reduced traffic rate limits are then sent, at operation 714, to associated servers to be applied to the network interfaces supporting the identified flows. For example, the reduced traffic rate limits may be communicated directly to the associated servers, via a communication network, and/or via one or more other network controllers. It is noted that the operations of FIG. 7 may be repeated on a periodic basis, on-demand basis, scheduled basis, based on a triggering event, etc. as necessary to maintain reasonable low latency conditions in the network.

Figure 8:
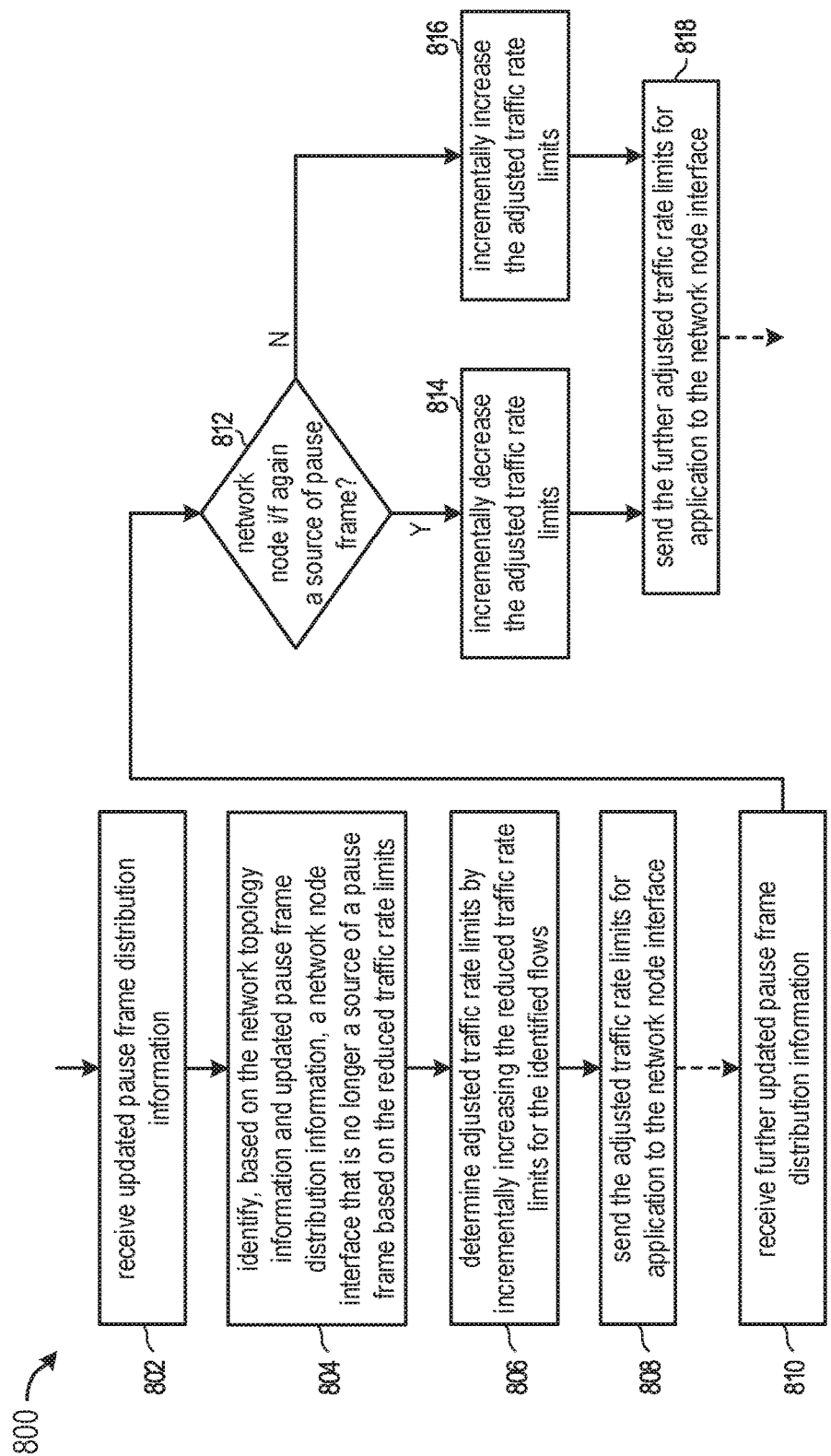
FIG. 8 is a logic diagram illustrating further traffic rate limit adjustments in accordance with embodiments of the present disclosure.

FIG. 8 is a logic diagram 800 illustrating further traffic rate limit adjustments in accordance with embodiments of the present disclosure. The illustrated operations may be performed, for example, by the LLN controller 102 following application of the traffic rate limit reduction operations of FIG. 7 to servers/network node interfaces of a network.

In operation 802, the LLN controller 102 receives updated pause frame distribution information that indicates a change in paused connections of a network. Next, in operation 804, the LLN controller 102 identifies, based on the network topology information and updated pause frame distribution information, a network node interface that is no longer a source of a pause frame (e.g., based on previously reduced traffic rate limits). The LLN controller 102 determines (operation 806) adjusted traffic rate limits by incrementally increasing the reduced traffic rate limits. The adjusted traffic rate limits are then communicated to be enforced by the server that includes the network node interface (operation 808).

In one example, the LLN controller 102 receives further updated pause frame distribution information (operation 810), and analyzes the updated information (operation 812) to determine whether the network node interface is again a source of a pause frame under the adjusted traffic rate limits. If so, the LLN controller 102 incrementally decreases (operation 814) the traffic rate limits for the network node and sends the further adjusted traffic rate limits to the relevant server (operation 818). In other examples, the further adjusted traffic rate limits are determined to be the preceding traffic rate limits or other prior traffic rate limits, including derivatives thereof, for which the network node interface was not a source of a pause frame.

If the network node interface is not a source of a pause frame under the adjusted traffic rate limits, the LLN controller 102 incrementally increases (operation 816) the traffic rate limits for the network node and sends the further adjusted traffic rate limits to the relevant server (operation 818). Operations 810-818 may be repeated on an iterative basis until optimal traffic rate limits (e.g., limits that are close to but under a level that causes a paused link) are established for the network node interface, thereby improving overall network performance.

FIG. 9 is a logic diagram 900 illustrating traffic rate limit reductions, based on network node interface utilization rates, in accordance with embodiments of the present disclosure. The illustrated operations may be performed, for example, by the LLN controller 102 in conjunction with (e.g., contemporaneously with) one or more of the operations of FIG. 7, FIG. 8 and FIG. 10.

In operation 902 of the illustrated example, the LLN controller 102 identifies, based on the network topology information and the traffic data, network node interfaces having a utilization rate greater than a predetermined threshold (such as the upper threshold illustrated in FIG. 6). Based on the traffic data, the LLN controller 102 further identifies (operation 904) flows supported by the identified network node interfaces. Next, in operation 906, the LLN controller 102 determines reduced traffic rate limits for one or more of the flows of the identified network node interfaces. The LLN controller 102 then sends (operation 908) the reduced traffic rate limits for application to the identified network node interfaces.

FIG. 10 is a logic diagram 1000 illustrating traffic rate limit increases, based on network node interface utilization rates, in accordance with embodiments of the present disclosure. The illustrated operations may be performed, for example, by the LLN controller 102 in conjunction with (e.g., contemporaneously with) one or more of the operations of FIG. 7, FIG. 8 and FIG. 9.

In operation 1002 of the illustrated example, the LLN controller 102 identifies, based on the network topology information and the traffic data, network node interfaces having a utilization rate less than a predetermined threshold (such as the lower threshold illustrated in FIG. 6). Based on the traffic data, the LLN controller 102 further identifies (operation 1004) flows supported by the identified network node interfaces. Next, in operation 1006, the LLN controller 102 determines increased traffic rate limits for one or more of the flows of the identified network node interfaces. The LLN controller 102 then sends (operation 1008) the increased traffic rate limits for application to the identified network node interfaces.

In some embodiments, the operations of FIGS. 9 and 10 can be utilized to establish initial traffic rate limits for servers of a network, and/or can be repeated on a periodic basis, on-demand basis, scheduled basis, based on a triggering event, based on updated traffic matrix data, etc.

Figure 11:
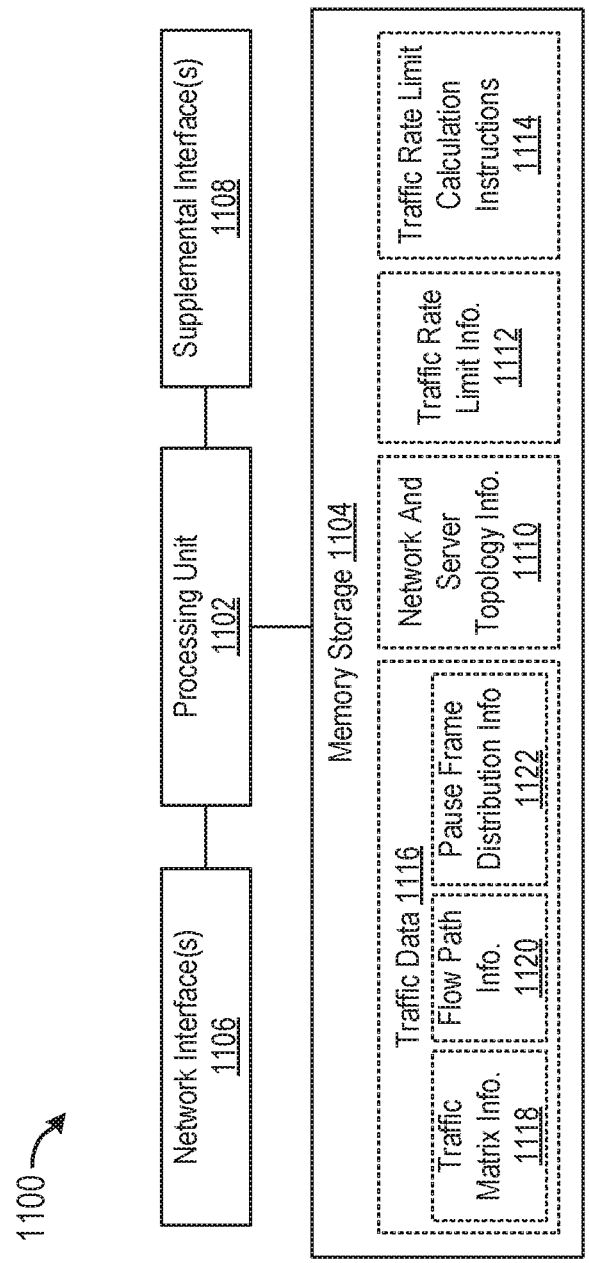
FIG. 11 is a block diagram of a low latency network controller in accordance with an embodiment of the present disclosure.

FIG. 11 is a block diagram of a low latency network (LLN) controller 1100 in accordance with an embodiment of the present disclosure. The illustrated embodiment includes processing unit 1102 (which can also be referred to as a processor, processing circuitry, judging unit, determining unit, executing unit, or equivalent terminology referencing a component capable of performing computations and/or other processing related tasks), a memory storage 1104, network interface(s) 1106, and supplemental interface(s) 1108, which may (or may not) be arranged as shown in FIG. 11. The LLN controller 1100 is configurable to implement the latency-mitigation methodologies described above.

The network interface(s) 1106 can be any component or collection of components that enable the LLN controller 1100 to communicate with the DCN 100, control plane controller 114 and probing controller 116 using messaging protocols. The supplemental interface(s) 1108 can be any component or collection of components that allow the LLN controller 1100 to communicate data or control information via a supplemental protocol. Alternatively, the supplemental interface(s) 1108 can include a user interface.

Memory storage 1104 is also coupled to the processing unit 1102, and stores programming and/or instructions that, when executed by the processing unit 1102, cause the LLN controller 1100 to determine and send (via network interface(s) 1106) traffic rate limits such as described in conjunction with FIGS. 7-10. For example, the illustrated memory storage 1104 stores network and server topology information 1110; traffic rate limit information 1112; traffic rate limit calculation instructions 1114; and traffic data 1116, including traffic matrix information 1118, flow path information 1120, and pause frame distribution information 1122.

It is noted that computer-readable instructions stored on a computer-readable medium (e.g., the traffic rate limit calculation instructions 1114 stored in the memory storage 1104) are executable by the processing unit 1102 of the LLN controller 1100. The traffic rate limit calculation instructions 1114 in some embodiments comprises software that, when executed by the processing unit 1102, performs traffic rate limit-related operations according to any of the embodiments included herein. A hard drive, CD-ROM, and RAM are some examples of articles including a non-transitory computer-readable medium such as a storage device/memory storage. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. Storage can also include networked storage, such as a storage area network (SAN).

It should be understood that software can be installed in and sold with a computer or device such the LLN controller 1100. Alternatively, the software can be obtained and loaded into the computer/device, including obtaining the software through a physical medium or distribution system, including, for example, from a server owned by the software creator or from a server not owned but used by the software creator. The software can be stored on a server for distribution over the Internet, for example.

According to a first aspect of the present disclosure, there is provided a computer-implemented method that includes receiving network topology information relating to a plurality of servers of a network and traffic data relating to flows of the network, the traffic data including traffic matrix information, flow path information, and pause frame distribution information. Based on the network topology information and the pause frame distribution information, one or more network node interfaces of the plurality of servers that are a source of a pause frame are identified. Based on the traffic data, flows of the one or more network node interfaces are also identified. The computer-implemented method further includes determining, based on the traffic data and predetermined criteria, a reduced traffic rate limit for each of a plurality of the identified flows, and sending the reduced traffic rate limits for application to the one or more network node interfaces.

In some embodiments of the computer-implemented method according to the first aspect of the present disclosure or any other aspects thereof, a number of optional operations and features are employed. One optional feature includes ranking the flows of an identified network node interface based on respective flow traffic volume values of the flows, and identifying one or more of the ranked flows having a cumulative traffic volume that constitutes a predetermined portion of a total flow traffic volume of the identified network node interface.

Optionally, in any of the preceding aspects, the predetermined criteria comprises determining a current traffic rate limit for each of the identified ranked flows, and decreasing the current traffic rate limits by a percentage basis.

Optionally, in any of the preceding aspects, the computer-implemented method further includes receiving updated pause frame distribution information and identifying, based on the network topology information and the updated pause frame distribution information, a network node interface of the one or more network node interfaces that is no longer a source of a pause frame based on the reduced traffic rate limits. The computer-implemented method additionally includes determining adjusted traffic rate limits by incrementally increasing the reduced traffic rate limits for the identified flows of the network node interface, and sending the adjusted traffic rate limits for application to the network node interface.

Optionally, in any of the preceding aspects, the computer-implemented method further includes receiving further updated pause frame distribution information. When the further updated pause frame distribution information indicates that the network node interface is a source of a pause frame based on the adjusted traffic rate limits, the computer-implemented method includes determining further adjusted traffic rate limits by incrementally decreasing the reduced traffic rate limits for the identified flows of the network node interface and sending the further adjusted traffic rate limits for application to the network node interface. When the further updated pause frame distribution information indicates that the network node interface is not a source of a pause frame based on the adjusted traffic rate limits, the computer-implemented method includes determining further adjusted traffic rate limits by incrementally increasing the reduced traffic rate limits for the identified flows of the network node interface and sending the further adjusted traffic rate limits for application to the network node interface.

According to another optional feature in any of the preceding aspects, the computer-implemented method further includes identifying, based on the network topology information and the traffic data, additional network node interfaces of the plurality of servers having a utilization rate greater than a predetermined threshold and identifying, based on the traffic data, additional flows of the additional network node interfaces. In this optional feature, the method further includes determining additional reduced traffic rate limits for one or more of the additional flows of the additional node interfaces, and sending the additional reduced traffic rate limits for application to the additional network node interfaces.

According to another optional feature in any of the preceding aspects, the computer-implemented method further includes identifying, based on the network topology information and the traffic data, additional network node interfaces of the plurality of servers having a utilization rate less than a predetermined threshold, and identifying, based on the traffic data, additional flows of the additional network node interfaces, wherein each network node interface of an additional flow is an additional network node interface. In this optional feature, the method further includes determining increased traffic rate limits for the additional flows of the additional network node interfaces and sending the increased traffic rate limits for application to the additional network node interfaces.

Optionally, in any of the preceding aspects, the computer-implemented method further includes identifying, based on the traffic data, initial flows of the plurality of servers and determining, based on the traffic data, an initial traffic rate limit for each of the initial flows. In this optional feature, the method further includes sending the initial rate limits for application to the plurality of servers.

Optionally, in any of the preceding aspects, the network is a data center network.

Optionally, in any of the preceding aspects, the computer-implemented method further provides that the method is repeated on a periodic basis.

According to another aspect of the present disclosure, a device is provided for use in managing latency in a network, the device including a memory storage comprising instructions, at least one network interface, and one or more processors in communication with the memory storage. The one or more processors execute the instructions to receive, via the at least one network interface, network topology information relating to a plurality of servers of a network and traffic data relating to flows of the network. In this aspect of the disclosure, the traffic data includes traffic matrix information, flow path information, and pause frame distribution information. Based on the network topology information and the pause frame distribution information, the one or more processors execute the instructions to identify one or more network node interfaces of the plurality of servers that are a source of a pause frame, and identify, based on the traffic data, flows of the one or more network node interfaces. The instructions are further executed to determine, based on the traffic data and predetermined criteria, a reduced traffic rate limit for each of a plurality of the identified flows, and to send, via the at least one network interface, the reduced traffic rate limits for application to the one or more network node interfaces.

According to one optional feature of this aspect of the present disclosure, the predetermined criteria comprises ranking the flows of an identified network node interface based on respective flow traffic volume, and identifying one or more of the ranked flows having a cumulative traffic volume that constitutes a predetermined portion of a total flow traffic volume of the identified network node interface.

Optionally, in any of the preceding aspects, the one or more processors further execute the instructions to receive, via the at least one network interface, updated pause frame distribution information; identify, based on the network topology information and the updated pause frame distribution information, a network node interface, of the one or more network node interfaces, that is no longer a source of a pause frame based on the reduced traffic rate limits;

determine adjusted traffic rate limits by incrementally increasing the reduced traffic rate limits for the identified flows of the network node interface; and send, via the at least one network interface, the adjusted traffic rate limits for application to the network node interface.

Optionally, in any of the preceding aspects, the one or more processors further execute the instructions to receive, via the at least one network interface, further updated pause frame distribution information. When the further updated pause frame distribution information indicates that the network node interface is a source of a pause frame based on the adjusted traffic rate limits, the one or more processors determine further adjusted traffic rate limits by incrementally decreasing the reduced traffic rate limits for the identified flows of the network node interface and send, via the at least one network interface, the further adjusted traffic rate limits for application to the network node interface for application to the additional network node interfaces. When the further updated pause frame distribution information indicates that the network node interface is not a source of a pause frame based on the adjusted traffic rate limits, the one or more processors determine further adjusted traffic rate limits by incrementally increasing the reduced traffic rate limits for the identified flows of the network node interface and send, via the at least one network interface, the further adjusted traffic rate limits for application to the network node interface for application to the additional network node interfaces.

Optionally, in any of the preceding aspects, the one or more processors further execute the instructions to identify, based on the network topology information and the traffic data, additional network node interfaces of the plurality of servers having a utilization rate greater than a first predetermined threshold; identify, based on the traffic data, additional flows of the additional network node interfaces; determine additional reduced traffic rate limits for one or more of the additional flows of the additional network node interfaces; and send, via the at least one network interface, the additional reduced traffic rate limits for application to the additional network node interfaces.

Optionally, in any of the preceding aspects, the one or more processors further execute the instructions to identify, based on the network topology information and the traffic data, additional network node interfaces of the plurality of servers having a utilization rate less than a predetermined threshold; identify, based on the traffic data, additional flows of the additional network node interfaces, wherein each network node interface of an additional flow is an additional network node interface; determine increased traffic rate limits for the additional flows of the additional network node interfaces; and send, via the at least one network interface, the increased traffic rate limits for application to the additional network node interfaces.

According to another optional feature in any of the preceding aspects, the one or more processors execute the instructions on a periodic basis.

Optionally, in any of the preceding aspects, the one or more processors further execute the instructions to identify, based on the traffic data, initial flows of the plurality of servers; determine, based on the traffic data, an initial traffic rate limit for each of the initial flows; and send, via the at least one network interface, the initial rate limits for application by the plurality of servers.

According to another aspect of the present disclosure, there is provided a computer-implemented method that includes receiving network topology information relating to a plurality of servers of a network and receiving traffic data relating to flows of the network, the traffic data including traffic matrix information, flow path information, and pause frame distribution information. Based on the network topology information and the pause frame distribution information, one or more network node interfaces of the plurality of servers that are a source of a pause frame are identified. Based on the traffic data, first flows of the one or more network node interfaces are also identified. The computer-implemented method further includes determining, based on the traffic data and predetermined criteria, a reduced traffic rate limit for each of a plurality of the identified first flows, and sending the reduced traffic rate limits for application to the one or more network node interfaces. The computer-implemented method further includes identifying, based on the network topology information and the traffic data, first additional network node interfaces of the plurality of servers having a utilization rate greater than a first predetermined threshold and identifying, based on the traffic data, first additional flows of the first additional network node interfaces. The method further includes determining additional reduced traffic rate limits for one or more of the first additional flows of the first additional node interfaces, and sending the additional reduced traffic rate limits for application to the first additional network node interfaces. The computer-implemented method further includes identifying, based on the traffic data, second additional flows, wherein each network node interface of a second additional flow is a second additional network node interface, and determining increased traffic rate limits for the second additional flows of the second additional network node interfaces, and sending the increased traffic rate limits for application to the second additional network node interfaces.

Optionally, in any of the preceding aspects, the computer-implemented method further includes receiving updated pause frame distribution information and identifying, based on the network topology information and the updated pause frame distribution information, a network node interface, of the one or more network node interfaces, that is no longer a source of a pause frame based on the reduced traffic rate limits. In this optional feature, the method further includes determining adjusted traffic rate limits by incrementally increasing the reduced traffic rate limits for the first flows of the network node interface, and sending the adjusted traffic rate limits for application to the network node interface.

In some embodiments of the computer-implemented method according to this aspect of the present disclosure or any other aspects thereof, the method further provides optional operations and features described in conjunction with the computer-implemented method of the first aspect of the disclosure described above.

Any of the foregoing examples may be combined with any one or more of the other foregoing examples to create a new embodiment within the scope of the present disclosure.

As may be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may also be used herein, the terms "processing circuitry," "processing circuit," "processor," and/or "processing unit" or their equivalents (such as identified above) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A processor, processing circuitry, processing circuit, and/or processing unit may be, or further include, memory and/or an integrated memory element, which may be a single memory device, a plurality of memory devices, and/or embedded circuitry of another module, processing circuitry, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuitry, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processor, processing circuitry, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the module, processing circuitry, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of the disclosure have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined if the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the present disclosure. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the disclosure. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

Although the present disclosure has been described with reference to specific features and embodiments thereof, it is evident that various modifications and combinations can be made thereto without departing from the scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A computer-implemented method for reducing latency in a network having a plurality of servers, the method comprising:
    receiving traffic data relating to flows of the network, the traffic data including traffic matrix information, flow path information, and pause frame distribution information;
    identifying, based on network topology information and the pause frame distribution information, one or more network node interfaces of the plurality of servers that are a source of a pause frame;
    identifying flows in the traffic matrix information which pass through the one or more network node interfaces;

determining, based on the traffic data and predetermined criteria, a reduced traffic rate limit for each of a plurality of the identified flows, the determining further comprising
  ranking the identified flows based on respective flow traffic volume, and
  decreasing a current traffic rate limit for each of a ranked flows in which the flow traffic volume exceeds the predetermined criteria;
identifying, based on the network topology information and the traffic data, one or more additional network node interfaces having a utilization rate greater than a predetermined threshold;
reducing an associated traffic rate limit for flows passing through the one or more additional network node interfaces with the utilization rate greater than the predetermined threshold;
determining adjusted traffic rate limits by incrementally increasing the reduced traffic rate limit for flows of a network node interface, of the one or more network node interfaces, identified as no longer a source of pause frame based on the reduced traffic rate limit;
determining further adjusted traffic rate limits by incrementally decreasing the reduced traffic rate limit for the identified flows of the network node interface when the network node interface is the source of a pause frame based on the adjusted traffic rate limits; and
determining further adjusted traffic rate limits by incrementally increasing the reduced traffic rate limit for the identified flows of the network node interface when the network node interface is not the source of a pause frame based on the adjusted traffic rate limits.

2. The computer-implemented method of claim 1, wherein the predetermined criteria comprises:
  ranking the flows of an identified network node interface based on respective flow traffic volume values of the flows; and
  identifying one or more of the ranked flows having a cumulative traffic volume that constitutes a predetermined portion of a total flow traffic volume of the identified network node interface.

3. The computer-implemented method of claim 2, wherein decreasing the current traffic rate limit by a percentage basis.

4. The computer-implemented method of claim 1 further comprising:
  receiving updated pause frame distribution information;
  identifying, based on the network topology information and the updated pause frame distribution information, the network node interface, of the one or more network node interfaces, that is no longer the source of the pause frame based on the reduced traffic rate limit; and
  sending the adjusted traffic rate limits for application to the network node interface.

5. The computer-implemented method of claim 4 further comprising:
  receiving further updated pause frame distribution information;
  determining whether the further updated pause frame distribution information indicates that the network node interface is the source of the pause frame based on the adjusted traffic rate limits; and
  sending the further adjusted traffic rate limits for application to the network node interface.

6. The computer-implemented method of claim 1 further comprising:
  identifying, based on the traffic data, additional flows of the additional network node interfaces;
  determining additional reduced traffic rate limit for one or more of the additional flows of the additional node interfaces; and
  sending the additional reduced traffic rate limit for application to the additional network node interfaces.

7. The computer-implemented method of claim 1 further comprising:
  identifying, based on the network topology information and the traffic data, the additional network node interfaces of the plurality of servers having the utilisation rate less than the predetermined threshold;
  identifying, based on the traffic data, additional flows of the additional network node interfaces, wherein each network node interface of an additional flow is an additional network node interface;
  determining increased traffic rate limits for the additional flows of the additional network node interfaces; and
  sending the increased traffic rate limits for application to the additional network node interfaces.

8. The computer-implemented method of claim 1, further comprising:
  identifying, based on the traffic data, initial flows of the plurality of servers;
  determining, based on the traffic data, an initial traffic rate limit for each of the initial flows; and
  sending the initial rate limits for application to the plurality of servers.

9. The computer-implemented method of claim 1, wherein the network is a data center network.

10. The computer-implemented method of claim 1, wherein the method is repeated on a periodic basis.

11. A device comprising:
  a memory storage comprising instructions;
  at least one network interface; and
  one or more processors in communication with the memory storage, wherein the one or more processors execute the instructions to:
    receive, via the at least one network interface, traffic data relating to flows of the network, the traffic data including traffic matrix information, flow path information, and pause frame distribution information;
    identify, based on network topology information and the pause frame distribution information, one or more network node interfaces of a plurality of servers that are a source of a pause frame;
    identify flows in the traffic matrix information which pass through the one or more network node interfaces;
    determine, based on the traffic data and predetermined criteria, a reduced traffic rate limit for each of a plurality of the identified flows, and further comprising
      ranking the identified flows based on respective flow traffic volume, and
      decreasing a current traffic rate limit for each of the ranked flows in which the flow traffic volume exceeds the predetermined criteria;
    identify, based on the network topology information and the traffic data, one or more additional network node interfaces having a utilization rate greater than a predetermined threshold;
    reduce an associated traffic rate limit for flows passing through the one or more additional network node interfaces with the utilization rate greater than the predetermined threshold;

determine adjusted traffic rate limits by incrementally increasing the reduced traffic rate limit for flows of a network node interface, of the one or more network node interfaces, identified as no longer a source of pause frame based on the reduced traffic rate limit;

determine further adjusted traffic rate limits by incrementally decreasing the reduced traffic rate limit for the identified flows of the network node interface when the network node interface is a source of the pause frame based on the adjusted traffic rate limits; and determine further adjusted traffic rate limits by incrementally increasing the reduced traffic rate limit for the identified flows of the network node interface when the network node interface is not a source of the pause frame based on the adjusted traffic rate limits.

12. The device of claim 11, wherein the predetermined criteria comprises:
ranking the flows of an identified network node interface based on respective flow traffic volume; and
identifying one or more of the ranked flows having a cumulative traffic volume that constitutes a predetermined portion of a total flow traffic volume of the identified network node interface.

13. The device of claim 11, wherein the one or more processors further execute the instructions to:
receive, via the at least one network interface, updated pause frame distribution information;
identify, based on the network topology information and the updated pause frame distribution information, the network node interface, of the one or more network node interfaces, that is no longer the source of the pause frame based on the reduced traffic rate limit; and
send, via the at least one network interface, the adjusted traffic rate limits for application to the network node interface.

14. The device of claim 13, wherein the one or more processors further execute the instructions to:
receive, via the at least one network interface, further updated pause frame distribution information;
determine whether the further updated pause frame distribution information indicates that the network node interface is a source of a pause frame based on the adjusted traffic rate limits; and
send, via the at least one network interface, the further adjusted traffic rate limits for application to the network node interface for application to the additional network node interfaces.

15. The device of claim 11, wherein the one or more processors further execute the instructions to:
identify, based on the network topology information and the traffic data, additional network node interfaces of the plurality of servers having a utilisation rate greater than a first predetermine d threshold;
identify, based on the traffic data, additional flows of the additional network node interfaces;
determine additional reduced traffic rate limit for one or more of the additional flows of the additional network node interfaces; and
send, via the at least one network interface, the additional reduced traffic rate limit for application to the additional network node interfaces.

16. The device of claim 11, wherein the one or more processors further execute the instructions to:
identify, based on the traffic data, additional flows of the additional network node interfaces, wherein each network node interface of an additional flow is an additional network node interface;
determine increased traffic rate limits for the additional flows of the additional network node interfaces; and
send, via the at least one network interface, the increased traffic rate limits for application to the additional network node interfaces.

17. The device of claim 11, wherein the one or more processors execute the instructions on a periodic basis.

18. The device of claim 11, wherein the one or more processors further execute the instructions to:
identify, based on the traffic data, initial flows of the plurality of servers;
determine, based on the traffic data, an initial traffic rate limit for each of the initial flows; and
send, via the at least one network interface, the initial rate limits for application by the plurality of servers.

* * * * *

UNITED STATES PATENT AND TRADEMARK OFFICE
CERTIFICATE OF CORRECTION

PATENT NO. : 10,873,529 B2  Page 1 of 1
APPLICATION NO. : 15/829319
DATED : December 22, 2020
INVENTOR(S) : F. Liu et al.

It is certified that error appears in the above-identified patent and that said Letters Patent is hereby corrected as shown below:

In the Claims

Column 18, Line 12 Claim 7, change "the utilisation" to -- the utilization --.
Column 20, Line 11 Claim 15, change "a utilisation" to -- a utilization --.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*